March 6, 1945. E. HELLIER 2,370,958
METHOD OF REPAIRING TIRES
Filed Sept. 7, 1944
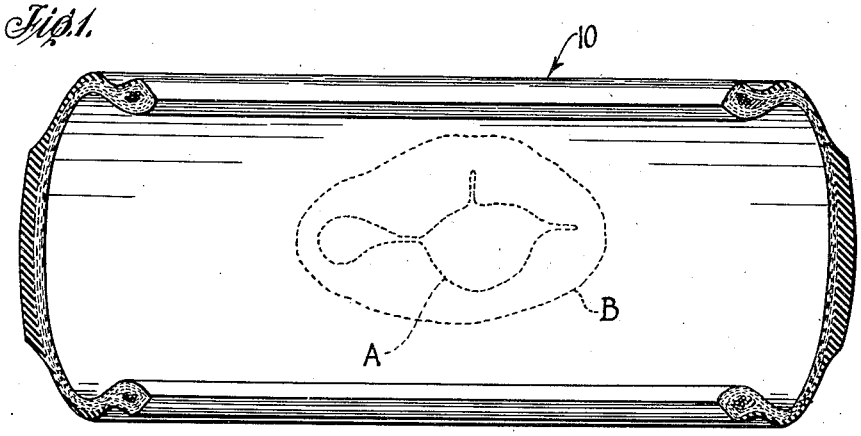
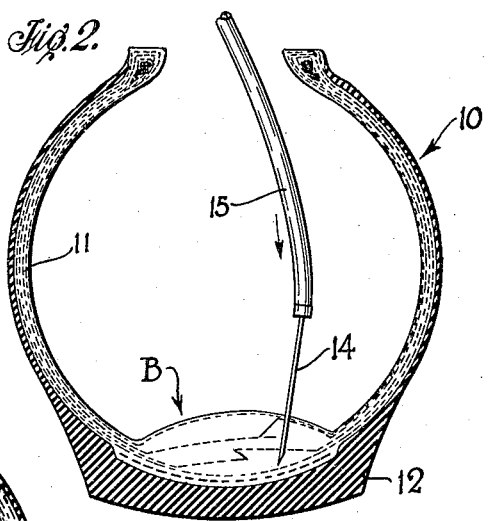
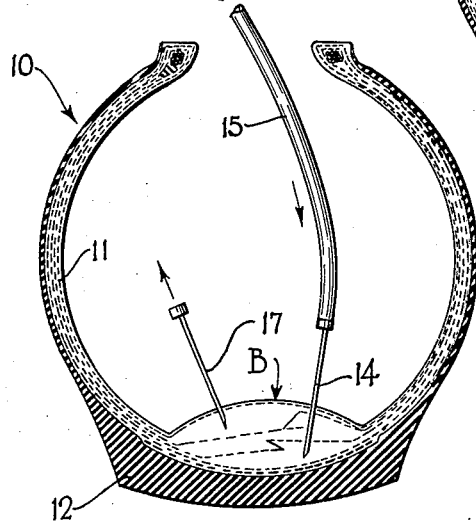
INVENTOR
EDWARD HELLIER
BY Ely & Frye
ATTORNEYS Patented Mar. 6, 1945

2,370,958

UNITED STATES PATENT OFFICE 2,370,958

METHOD OF REPAIRING TIRES

Edward Hellier, Louisville, Ky.

Application September 7, 1944, Serial No. 553,080

8 Claims. (Cl. 154—14)

This invention relates to methods of repairing pneumatic tire casings composed of fabric and rubber or rubber-like composition, and more especially it relates to improved procedure for removing ply separations between laminations of fabric or rubber in pneumatic tires.

Ply separation may be present in newly manufactured tires, and also in tires which have been extensively used. When present in a tire in use they constitute a driving hazard since even a small area of separation will become more extensive, with the result that there is friction between the tire plies, excessive heat is generated, and ultimately there is premature failure of the tire. Ply separation in used tires may result from excessive strain due to severe service conditions, or they may result from inherent constructional defects that are impossible to detect upon closest inspection. Ply separation in newly manufactured tires may result from the entrapping of air or moisture between the tire plies during fabrication thereof, or, as usually is the case, from excessive local strains arising from deformation of tires during the removal of the expansible cores therefrom. Such separations readily may be detected upon inspection of the inner surface of the tires where their presence is betrayed by blister-like bulges that are coincident with the affected areas. Such tires usually are consigned to salvage since prior to the present invention no commercially practical method has been devised for repairing them. It is to the relief of this condition that this invention is directed.

The chief objects of the invention are to provide in a facile and economical manner for repairing ply separations in pneumatic tire casings; to prolong the useful life of tires that develop ply separation in service; to provide for the repair of ply separations in newly manufactured tires so that they may be sold to the consumer, thus obviating the expense incurred heretofore when such tires were scrapped; to increase the output of satisfactory pneumatic tire casings; and to produce repaired tire casings in no way inferior to initially perfect tires. Other objects will be manifest as the description proceeds.

Of the accompanying drawing:

Fig. 1 is a fragmentary view of the inside of a tire casing showing an area in which ply separation is present;

Fig. 2 is a cross-section, on a larger scale, through a tire and a ply separation therein showing the initial step of the improved method; and Fig. 3 is a section similar to Fig. 2 showing a subsequent step of the improved method.

Referring to the drawing, there is shown a pneumatic tire casing 10 of conventional shape and structure, which casing, for illustrative purposes, is shown as comprising a carcass or body structure 11 of four plies of rubberized fabric, and a tread structure 12 of rubber composition. It will be understood that the term "rubber" as used herein may be any type of natural rubber or any type of synthetic rubber composition, the method of the invention being applicable to the repair of tires of any of these types.

Referring particularly to Fig. 1, there is indicated at A an internal area of ply separation in the tire 10. The area A is shown with an extremely irregular contour such as normally obtains in most ply separations, due to the tendency of the separation to follow some of the cords of the fabric plies, which cords extend transversely of each other in adjacent plies. It will be understood, also, that a single area of ply separation may include coincident separation of three or more plies, the separations being in communication with each other by reason of openings or splits in intervening fabric plies, which openings are the result of failure of the rubber between adjacent cord strands of respective fabric plies. This condition is illustrated in Figs. 2 and 3. Furthermore, sometimes there are two or more separations located in the same area of the tire with no split or break in the intervening fabric plies.

Not all ply separation reveals its presence by a blister or bulge on the inner surface of the tire. Hence it is desirable, preparatory to the repairing of a tire, to locate all areas of separation therein. To this end a hollow needle, such as a hypodermic needle 14, connected by a flexible tube or pipe 15 to a source (not shown) of air or gas under pressure, is provided. The operator probes the tire casing 11, from the inside of the tire, with the needle 14 while air or gas is discharging therefrom. If the needle enters a separation, a clearly visible bubble or blister will be formed. If desired, the location of the blister may be outlined with chalk or crayon. If there is more than one separation situated in the same area of the tire, and there is no break in the ply or plies between the separations, then the separation nearest the perimeter of the tire may be located by forcing the needle into the separation before discharging air from the needle. Then after discharging air from the needle to locate the separation, the air is evacuated from the separation either through the same needle or through a second hollow needle. The procedure described is then repeated, but with the needle forced less deeply into the tire, to locate any other separation in the same area of the tire.

After a tire has been inspected as described and separations located, the operation of repairing the tire may be initiated. The first step in the repair operation consists in inserting the needle 14 into the separation A and discharging gaseous fluid into the separation until sufficient internal pressure is built up to effect further separation or division of the bond between the fabric plies. The result is to increase the area of the separation, and since the pressure of the fluid is equal in all directions, the perimeter of the enlarged separation will be more nearly uniform, as is most clearly indicated at B, Fig. 1, without the tentacle-like projection present in the original separation indicated at A in the same Fig. 1. After the separation has been enlarged to the extent desired, it is deflated in the manner previously described.

The next step of the process is to fill the separation B with a vulcanizable rubber solution or cement. For this purpose any suitable device similar to an oil or fluid grease gun (not shown) may be employed, the same being provided with a small, sharp-pointed discharge nozzle that may be employed to pierce the fabric or rubber plies overlying the separation. By means of the device described, the solution or cement may be forced into the separation in the tire. If there are two or more connected separations in the same area of the tire, the injection is made from the inside of the tire into the separation nearest the outside of the tire, so that as the said separation becomes filled, the composition will flow or pass upwardly through the split in the fabric ply above the separation, and thus will fill overlying separation. This will continue until all the separations are filled with the composition or cement. If the separations are so large as to require more than a pint of cement, air may be injected into the fill to effect separation of the plies, after which the tire is turned and tilted in all directions so that the cement is caused to flow to all edges of all separations, whereby the surfaces of the fabric plies at the separations are completely coated with the cement. Thereafter the excess cement is withdrawn from the separation cavity or cavities preferably by suction produced by reversal of the injection apparatus. If desired, the excess cement may be expressed from the tire, through a small hole made at an edge of the separations, either by pressure applied to the plies manually by the operator, or by the pressure of air which may be injected into the cavities in the manner herein set forth. Removal of the excess cement leaves a coating of cement upon the surfaces of the separated fabric plies.

The rubber composition or cement usually comprises a volatile solvent for the rubber or rubber-like constituent of the composition, and the next step of the improved process is the removal of such solvent from the coating that remains on the fabric plies confronting the separations. Removal of the solvent is effected by volatilizing or evaporating the solvent, and then removing it while in gaseous form. Evaporation of the volatile solvent is expedited by the passage of air over the cement-coated plies confronting the separations. To this end the hollow needle 14 and flexible tube or pipe 15 again may be employed for injecting air into the separations. For venting air from the separations, a hollow needle 17, Fig. 3, similar to needle 14, may be inserted into the separation through the overlying fabric plies. The arrangement is such as to effect a circulation of air within the separations, to hasten the evaporation of the cement-solvent, and concurrently to remove the air and solvent. The presence of the venting needle 17 assures that this step of the method will not build up sufficient pressure within the separations to cause enlargement of the area thereof. This step of the method may require two or three hours time depending upon several different factors, including the viscosity of the cement. If the tire is warm the operation will be expedited.

It is of primary importance that the air employed for evaporating the solvent from the cementitious composition as described be absolutely dry. If this were not so there would be a deposition of moisture within the separation cavities, which moisture would vaporize or "blow" during subsequent vulcanization of the repair and thus prevent the re-bonding of the fabric plies to eliminate the separation therebetween. Accordingly, the air that is conducted through the pipe 15 and discharged into the tire first is passed over calcium chloride or other drying medium to remove any moisture or oil therefrom. Apparatus for drying the air is shown conventionally at 18, Fig. 3, any standard drying apparatus being suitable for the purpose.

If there are several separations in the same area of the tire and the separations are interconnected through breaks in the intervening fabric plies, the needle 14 will be inserted into the separation nearest the outside of the tire and the venting needle 17 will be inserted into the separation nearest the inside of the tire as shown in Fig. 3. If there is only one separation in one area of the tire, both needles are inserted into the same separation. If there are two or more unconnected separations in the same area of the tire, that is, if the intervening fabric plies are not split or opened, then each separation must be treated individually in the same manner as when they are located in different areas of the tire.

After the separations have been dried in the manner described, they are flattened to bring the separated fabric plies firmly into contact with each other so that their coated surfaces adhere to each other throughout their entire area. Such flattening of the separations may be effected manually, preferably by means of a stitcher roller. During the flattening operation, hollow needles, such as the needle 17, may be inserted into the separations to vent therefrom any air that may have remained therein from the drying operation.

The final step of the process is the vulcanizing of the cementitious composition in the separations. This may be accomplished in any known or preferred manner, for example, by a repair vulcanizer that applies heat and pressure to the affected part of the tire. If the rubber composition in the cement is so compounded as to be air-curing, the repair will be self-vulcanized after a relatively brief lapse of time.

From the foregoing it will be apparent that the invention provides an efficient method of repairing tires, that results in substantial economies, and which achieves the other advantages set out in the foregoing statement of objects.

Modification may be resorted to without departing from the spirit of the invention or the scope thereof as defined by the appended claims.

What is claimed is:

1. The method of repairing ply separations within pneumatic tire casings which comprises enlarging the area of the ply separation to render its perimeter more nearly uniform, applying an adhesive comprising rubber to the surfaces of the tire plies exposed by the separation, drying the adhesive by removing solvent therefrom, pressing the tire plies together to adhere them to each other and thereby to eliminate the separation therebetween, and thereafter effecting vulcanization of the adhesive.

2. The method as defined in claim 1 wherein the enlarging of the area of ply separation is effected by the discharging of gaseous fluid under pressure into the separation in the tire.

3. The method of repairing ply separations within pneumatic tire casings which comprises enlarging the area of ply separation to render its perimeter more nearly uniform, applying an adhesive containing vulcanizable rubber composition to the surfaces of the tire plies that are exposed by the separation, drying the adhesive by circulating a gaseous fluid into and out of the separation for a sufficient interval of time to evaporate the solvent in the adhesive and remove it from the tire, pressing the separated plies together to adhere them to each other and thereby to eliminate the separation, and thereafter effecting vulcanization of the adhesive.

4. A method as defined in claim 3 including the step of drying the gaseous fluid before circulating it within the separation.

5. The method of repairing ply separation within pneumatic tire casings which comprises enlarging the area of the ply separation to render its perimeter more nearly uniform, filling the separation with a viscous vulcanizable rubber cement under pressure to coat the exposed surfaces of the tire plies therewith, withdrawing the surplus cement, evaporating and removing the solvent from the cement that adheres to the tire plies about the separation, pressing the tire plies together to adhesively unite them and thereby to eliminate the separation, and thereafter effecting vulcanization of the adhesive to bond the coated plies to each other.

6. A method as defined in claim 5 including the step of adding air under pressure to the separation while the cement is therein to force the latter into all portions of the separation in cases where the separation is relatively extensive.

7. A method as defined in claim 5 including the step of venting the separation to the atmosphere while the separated and coated fabric plies are being pressed into adhesive engagement, to obviate the entrapping of air within the tire.

8. The method of repairing ply separation in the interior of a pneumatic tire casing which comprises injecting air under pressure into the separation to enlarge the area of the separation and render its margin more nearly uniform, injecting viscous vulcanizable rubber cement into the separation and causing it to flow to all parts of the separation so as to coat the exposed surfaces of the tire plies with cement, forcing the surplus cement from the separation, injecting dry air under pressure into the separation and then withdrawing it therefrom after it has circulated thereabout to evaporate solvent from the cement and remove it from the separation, pressing the coated plies forcibly together to adhere them to each other while venting the separation to obviate the entrapping of air within the tire, and then effecting vulcanization of the adhesive in the tire to bond the tire plies to each other and thereby to eliminate the separation.

EDWARD HELLIER.